(12) United States Patent
Wang et al.

(10) Patent No.: US 9,946,414 B2
(45) Date of Patent: Apr. 17, 2018

(54) IN-CELL TOUCH PANEL HAVING A TOUCH SENSING CHIP AND A CORRESPONDING DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chunlei Wang, Beijing (CN); Hailin Xue, Beijing (CN); Haisheng Wang, Beijing (CN); Jian Wang, Beijing (CN); Lei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/646,898

(22) PCT Filed: Aug. 27, 2014

(86) PCT No.: PCT/CN2014/085318
§ 371 (c)(1),
(2) Date: May 22, 2015

(87) PCT Pub. No.: WO2015/180274
PCT Pub. Date: Dec. 3, 2015

(65) Prior Publication Data
US 2016/0252995 A1 Sep. 1, 2016

(30) Foreign Application Priority Data

May 30, 2014 (CN) .......................... 2014 1 0240495

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ...... G06F 3/044; G06F 3/0412; G06F 3/0416; G06F 3/045; G06F 3/0418; G06F 3/041;
(Continued)

(56) References Cited

U.S. PATENT DOCUMENTS

| 8,159,467 B2 * | 4/2012 | Gray ........................ G06F 3/044 345/173 |
| 2011/0242027 A1 * | 10/2011 | Chang ................... G06F 3/0412 345/173 |

(Continued)

FOREIGN PATENT DOCUMENTS

| CN | 102541333 A | 7/2012 |
| CN | 103258492 A | 8/2013 |

(Continued)

OTHER PUBLICATIONS

First Chinese Office Action dated Jun. 3, 2016; Appln. No. 201410240495.5.
(Continued)

*Primary Examiner* — Nalini Mummalaneni
(74) *Attorney, Agent, or Firm* — Ladas & Parry LLP; Loren K. Thompson

(57) ABSTRACT

An in-cell touch panel and a display device are disclosed. The in-cell touch panel includes a plurality of self-capacitance electrodes disposed on the same layer and independent from each other, a touch sensing chip and a plurality of wires. The self-capacitance electrodes constitute a common electrode layer and the wires and the self-capacitance elec-
(Continued)

trodes are disposed on different layers. The touch sensing chip is configured to apply common electrode signals to self-capacitance electrodes in a display time period and determine touch positions by detecting capacitance value variation of self-capacitance electrodes in a touch time period. In the touch panel, the common electrode layer is reused as self-capacitance electrodes, thereby implementing touch function without a touch dead zone.

15 Claims, 5 Drawing Sheets

(58) Field of Classification Search
CPC ...... G06F 3/047; G06F 3/03545; G06F 3/042; G06F 2203/04103; G06F 2203/04112; G06F 2203/04111; G06F 2203/04101; G06F 2203/04107; G06F 2203/04104; G06F 2203/04108; G06F 2203/04113; G06F 1/3262; G02F 1/13338; G02F 1/136286; G02F 1/1368; G02F 1/134336; G02F 1/134309; G02F 1/136227; G02F 1/13306; G02F 2001/134318; G02F 2001/121; G02F 2001/13456; G09G 3/3655; G09G 3/3696; G09G 3/36; G09G 3/3611; G09G 5/003; G09G 2310/0208; G09G 2300/0408; G09G 2300/0413; G09G 2300/0426; H01L 27/323; H01L 27/124; H01L 51/56; H01L 51/5203; H03K 17/962
See application file for complete search history.

(56) References Cited

U.S. PATENT DOCUMENTS

| | | |
|---|---|---|
| 2011/0242028 A1 | 10/2011 | Lee et al. |
| 2013/0215075 A1 | 8/2013 | Lee et al. |
| 2013/0314625 A1* | 11/2013 | Tsai .......................... G06F 3/044 349/12 |
| 2014/0061597 A1* | 3/2014 | Choi .................... H01L 51/5284 257/40 |
| 2014/0078414 A1 | 3/2014 | Lee |
| 2014/0132559 A1 | 5/2014 | Kim |
| 2014/0362031 A1* | 12/2014 | Mo ........................... G09G 3/36 345/174 |
| 2015/0070285 A1 | 3/2015 | Qiu |
| 2015/0177880 A1* | 6/2015 | Shin ....................... G06F 3/0412 345/174 |

FOREIGN PATENT DOCUMENTS

| | | |
|---|---|---|
| CN | 103279245 A | 9/2013 |
| CN | 103294322 A | 9/2013 |
| CN | 103455205 A | 12/2013 |
| CN | 103472613 A | 12/2013 |
| CN | 203376696 U | 1/2014 |
| CN | 103677412 A | 3/2014 |
| CN | 103681737 A | 3/2014 |
| CN | 103793120 A | 5/2014 |
| JP | 2011-150115 A | 8/2011 |

OTHER PUBLICATIONS

International Search Report dated Mar. 3, 2015; PCT/CN2014/085318.
Written Opinion of the International Searching Authority dated Mar. 4, 2015; PCT/CN2014/085318.
Second Chinese Office Action dated Nov. 30, 2016; Appln. No. 201410240495.5.
Extended European Search Report dated Dec. 8, 2017; Appln. No. 14863037.9.

* cited by examiner

IN-CELL TOUCH PANEL HAVING A TOUCH SENSING CHIP AND A CORRESPONDING DISPLAY DEVICE

TECHNICAL FIELD

At least one embodiment of the present invention relates to an in-cell touch screen and a display device.

BACKGROUND

With the fast development of display technology, touch screen panels have become popular in people's life gradually. At present, according to constitution structures, touch screens may be classified into add-on mode touch panels, on-cell touch panels and in-cell touch panels. For an add-on mode touch panel, the touch panel and the liquid crystal display (LCD) are produced separately and then attached together to form a liquid crystal display with touch function. Add-on mode touch panels suffer disadvantages such as high manufacturing cost, low light transmission rate and thick assembly. For an in-cell touch panel, touch electrodes of the touch panel are embedded inside the liquid crystal display, which can reduce the overall thickness of the assembly, and can drastically reduce manufacturing cost of the touch panel. Therefore, in-cell touch panels have received great attention from panel manufacturers.

At present, an in-cell touch panel can detect the touch position of a finger in accordance with the mutual capacitance or self-capacitance principle. For the self-capacitance principle, it is possible to provide a plurality of self-capacitance electrodes disposed in the same layer and insulated from each other in the touch panel. When a human body does not touch the screen, each self-capacitance electrode experiences capacitance at a fixed value. When a human body touches the screen, respective self-capacitance electrodes experience capacitance that is at a value of the fixed value plus the body capacitance. The touch sensing chip can determine the touch position by detecting capacitance value variation of self-capacitance electrodes in a touch period. Since the body capacitance can act on all the self-capacitances, as compared to the approach in which the body capacity that can only act on projection capacitance in mutual capacitance, the touch variation caused by body touching the screen would be greater than that of the touch panel manufactured in accordance with mutual capacitance principle.

While designing touch panels with self-capacitance principle, each self-capacitance electrode needs to be connected with a touch sensing chip through a separate lead-out wire. As shown in FIG. 1, each lead-out wire may include: a wire 2 for connecting the self-capacitance electrode 1 to the margin frame of the touch panel, and a periphery wiring 4 disposed at the margin frame for connecting the self-capacitance electrode 1 to a connecting terminal 3 of the touch sensing chip.

SUMMARY

At least one embodiment of the present invention provides an in-cell touch panel and a display device to eliminate touch dead zone of touch panels utilizing self-capacitance principle.

At least one embodiment of the present invention provides an in-cell touch panel including: a top substrate and a bottom substrate disposed opposite to each other, a plurality of self-capacitance electrodes disposed on a same layer and independent from each other, a touch sensing chip and a plurality of wires for connecting the self-capacitance electrodes to the touch sensing chip. The self-capacitance electrodes and the wires are both disposed on a side of the top substrate that faces the bottom substrate; the self-capacitance electrodes constitute a common electrode layer and the wires and the self-capacitance electrodes are disposed on different layers; the touch sensing chip is configured to apply common electrode signals to self-capacitance electrodes in a display time period and determine touch positions by detecting capacitance value variation of self-capacitance electrodes in a touch time period.

At least one embodiment of the present invention provides a display device including the above-mentioned in-cell touch panel provided in embodiments of the present invention.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not imitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Thicknesses and shapes of layers in the accompanying drawings do not reflect real scale, and only serve to illustrate contents of the present invention.

Figure 1:
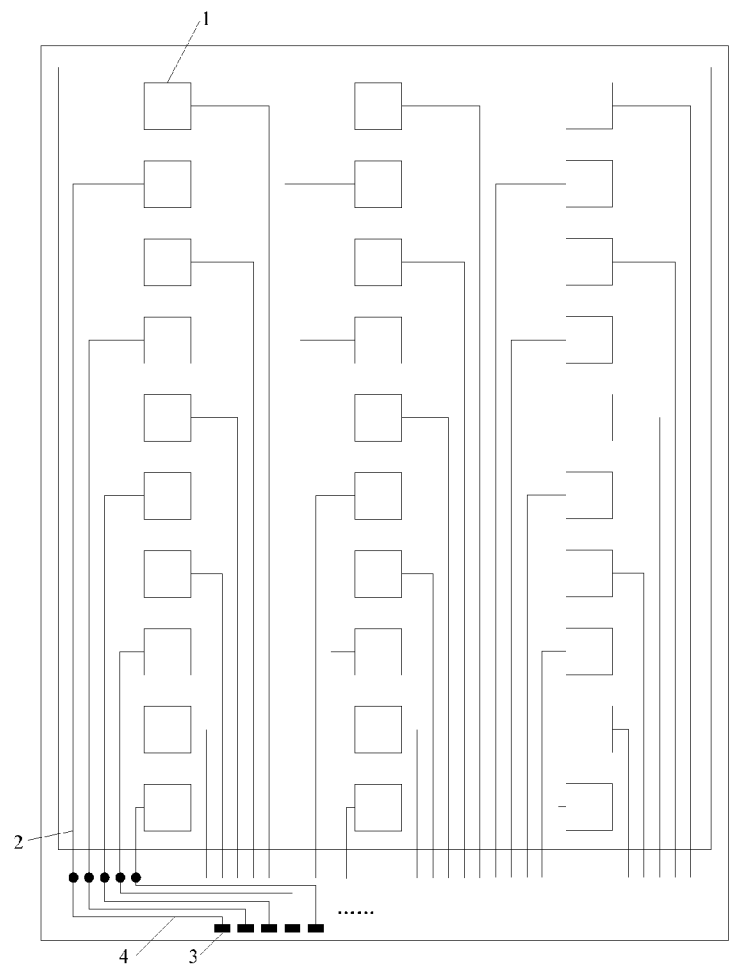
FIG. 1 is a top structural view of a self-capacitance electrode in a touch panel.

The inventors of the present application have noted that, in the specific implementation as shown in FIG. 1, there are many corresponding lead-out wires due to the large number of self-capacitance electrodes. Considering an example in which each self-capacitance electrode occupies an area of 5 mm * 5 mm, a 5 inch liquid crystal display would require 264 self-capacitance electrodes. If each self-capacitance electrode is designed smaller, there will be more self-capacitance electrodes, and more lead-out wires need to be provided. While designing, in order to reduce the number of layers, wires in lead-out wires and self-capacitance electrodes are generally disposed on the same layer, which can add only one layer in the touch panel, however, relatively large number of wires may cause a large touch dead zone. The touch dead zone refers to a region where wirings are concentrated in a touch panel, in this zone signals are relatively disordered and therefore it is named as touch dead zone, which means touch performance can not be guaranteed in this area. FIG. 1 is explained with respect to 30 self-capacitance electrodes as an example. 30 self-capacitance electrodes need 30 wires for leading them out to the margin frame. 10 wires are needed for the place where wires are densest, which could result in large touch dead zones.

Therefore, it is desired to eliminate touch dead zones in a touch panel to ensure touch performance while not adding too many layers.

The in-cell touch panel described below as provided in embodiments of the present invention is applicable to twisted nematic (TN) type liquid crystal displays.

Figure 2:
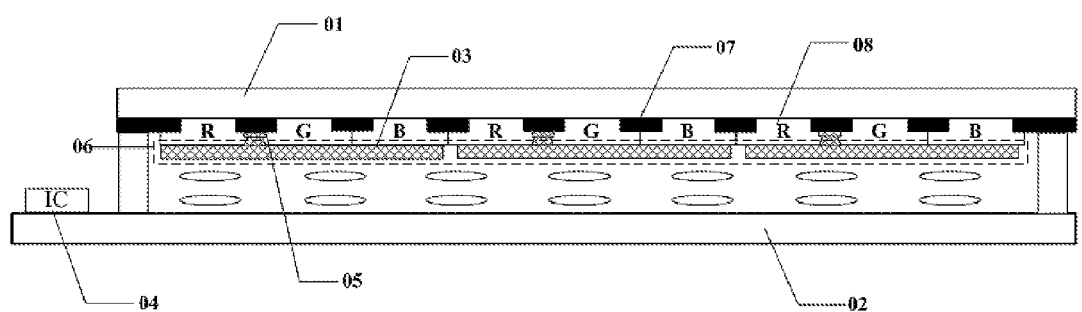
FIG. 2 is a structural view of an in-cell touch panel provided in an embodiment of the present invention.
Figure 3:
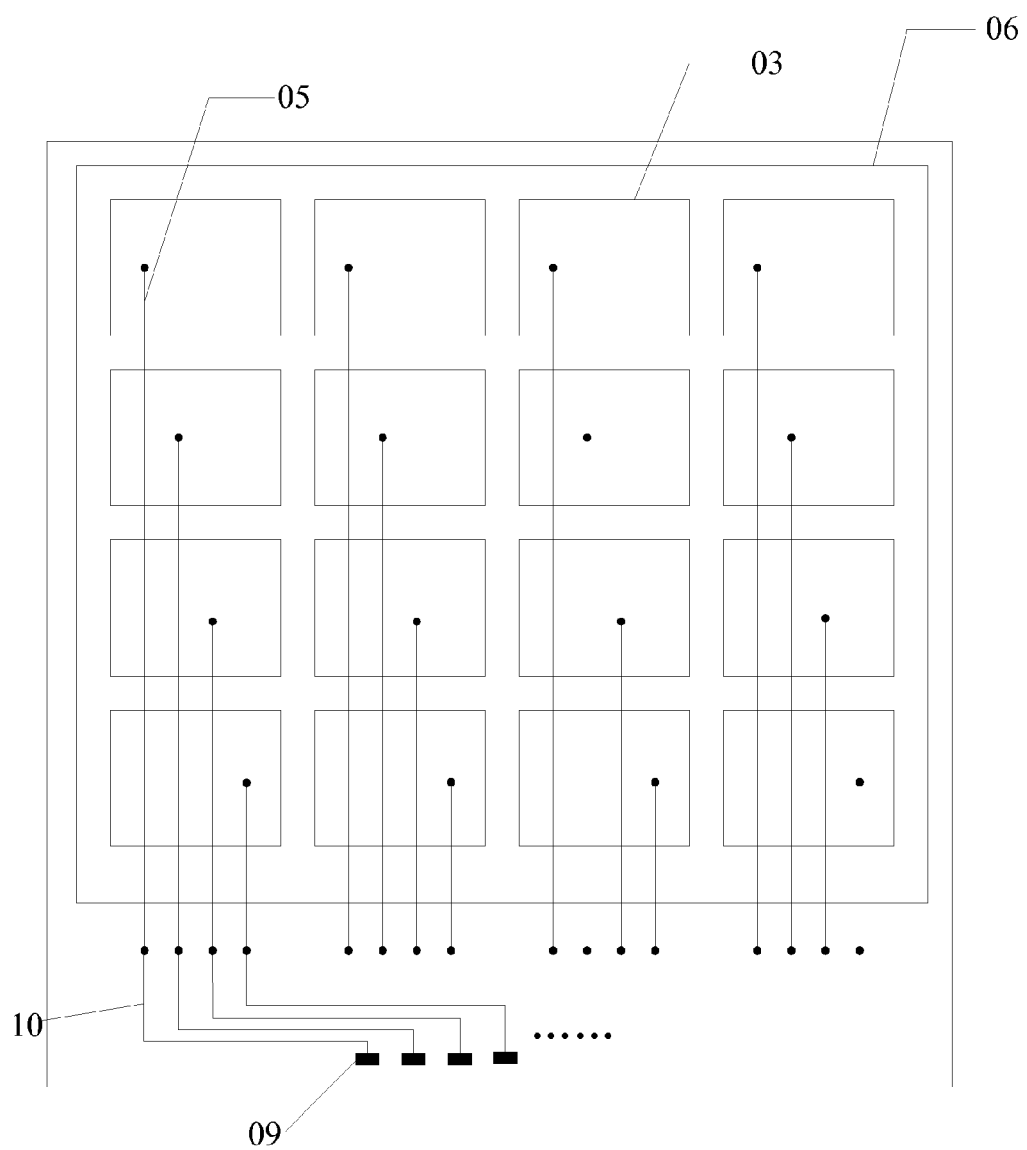
FIG. 3 is a top structural view of an in-cell touch panel provided in an embodiment of the present invention.

At least one embodiment of the present invention provides an in-cell touch panel as shown in FIG. 2, including a top substrate 01 and a bottom substrate 02 disposed opposite to each other, a plurality of self-capacitance electrodes 03 disposed on the same layer and independent from each other, a touch sensing chip 04 and a plurality of wires 05 for connecting self-capacitance electrodes to the touch sensing chip 04. Self-capacitance electrodes 03 and wires 05 are both disposed on a side of the top substrate 01 that faces the bottom substrate 02. As shown in FIG. 3, self-capacitance electrodes 03 form a common electrode layer 06, and wires 05 are disposed on different layer from self-capacitance electrodes 03. The touch sensing chip 04 is configured to apply common electrode signals to self-capacitance electrodes 03 in a display time period and determine touch positions by detecting capacitance value variation of self-capacitance electrodes 03 in a touch time period.

For the above-mentioned touch panel provided in the embodiment of the present invention, the common electrode layer 06 is multiplexed/reused as self-capacitance electrodes 03 in accordance with the self-capacitance principle by modifying the pattern of TN mode common electrode layer 06 to partition it into a plurality of independent self-capacitance electrodes 03; and a layer of wires 05 for connecting self-capacitance electrodes 03 to the touch sensing chip 04 is added on the top substrate 01. As compared to the display panel shown in FIG. 1, the touch panel provided in the embodiment of the present invention can eliminate touch dead zones in the touch panel by adding only one layer of wires 05 disposed on different layer from self-capacitance electrodes 03 after reusing the common electrode layer 06 as self-capacitance electrodes 03, thereby implementing touch function without touch dead zone and improving signal-to-noise ratio of the touch performance.

Since in the above-mentioned touch panel provided in the embodiment of the present invention, the common electrode layer 06 is reused as self-capacitance electrodes 03, in one implementation, a time-division driving mode for touch and display time periods may be used. In another implementation, it is also possible to integrate the display driving chip and touch sensing chip as one chip to further reduce the production costs.

Figure 4A:
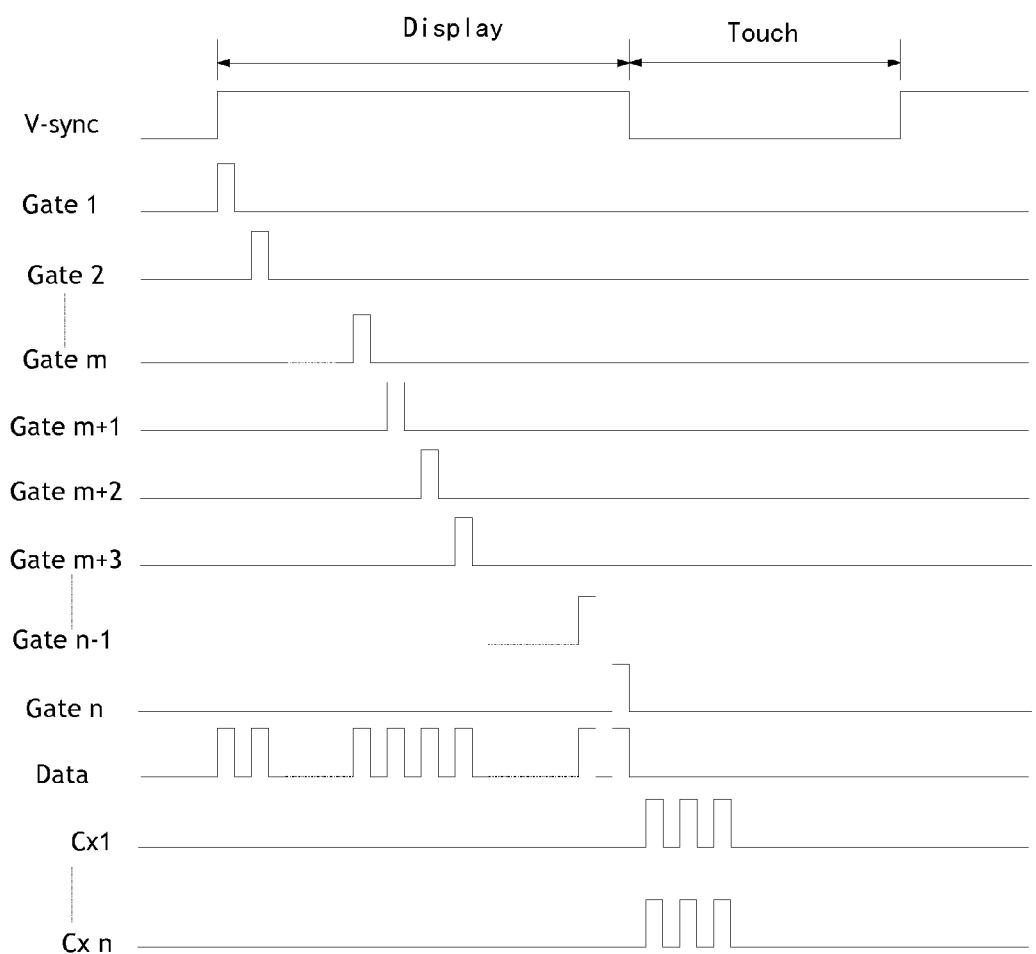
FIGS. 4a and 4b are driving time sequence diagrams of an in-cell touch panel provided in an embodiment of the present invention respectively.
Figure 4B:
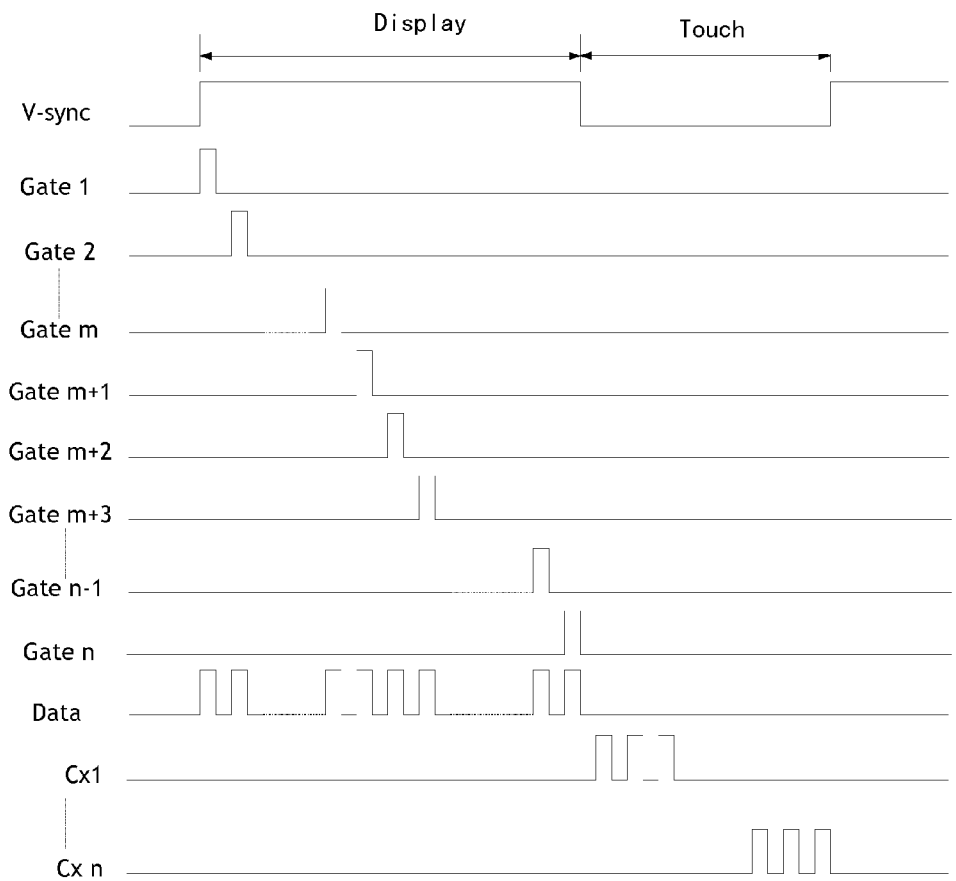

For example, in the driving timing sequence diagram shown in FIGS. 4a and 4b, the time period for the touch panel to display each frame (V-sync) is divided into a display time period (Display) and a touch time period (Touch). For example, in the driving timing sequence diagram shown in FIGS. 4a and 4b, the time period for the touch panel to display one frame is 16.7 ms in which 5 ms may be selected as a touch time period and the other 11.7 ms as a display time period. Of course it is also possible to appropriately adjust durations of both according to the processing capacity of IC chips, which is not specifically limited here. In the display time period (Display), each gate signal line Gate1, Gate2 . . . Gate n in the touch panel is applied with gate scanning signals successively, data signal lines Data are applied with gray scale signals, and the touch sensing chip connected with self-capacitance electrodes Cx 1 . . . Cx n applies common electrode signals to self-capacitance electrodes Cx 1 . . . Cx n respectively to implement liquid crystal display function. In the touch time period (Touch), as shown in FIG. 4a, the touch sensing chip connected with self-capacitance electrodes Cx 1... Cx n applies driving signals to self-capacitance electrodes Cx 1 . . . Cx n at the same time, and receives feedback signals of self-capacitance electrodes Cx 1 . . . Cx n at the same time. As shown in FIG. 4b, it is also possible that the touch sensing chip connected with self-capacitance electrodes Cx 1 . . . Cx n applies driving signals to self-capacitance electrodes Cx 1 . . . Cx n successively, and receives feedback signals of self-capacitance electrodes Cx 1 . . . Cx n respectively, which is not limited herein. Touch function is implemented by analyzing feedback signals to determine whether any touch occurs.

The resolution for touch panel is generally on the order of millimeter. Therefore, in one implementation, it is possible to choose density of and the area occupied by self-capacitance electrodes 03 according to the required touch resolution to ensure the required touch resolution. Generally, self-capacitance electrodes 03 are designed as about 5 mm * 5 mm square electrodes, and the resolution for a display screen is generally on the order of microns. Therefore, one self-capacitance electrode 03 generally corresponds to a plurality of pixel units in a display screen. For the above-mentioned in-cell touch panel provided in the embodiment of the present invention, the common electrode layer 06 disposed in its entire layer on the top substrate 01 is partitioned into a plurality of self-capacitance electrodes 03. In order not to influence normal display function, while partitioning the common electrode layer 06, the partitioning lines may keep clear of opening regions for display and are disposed in pattern regions of the black matrix layer.

For example, as shown in FIG. 2, the above-mentioned touch panel provided in the embodiment of the present invention may further include a black matrix layer 07 disposed on a side of the top substrate 01, which side faces the bottom substrate 02 or on a side of the bottom substrate 02, which side faces the top substrate 01. Orthogonal projections of gaps between adjacent two self-capacitance electrodes 03 on the bottom substrate 02 are within regions of patterns of the black matrix layer 07.

In the in-cell touch panel provided in the embodiment of the present invention, since body capacitance acts on self-capacitances of self-capacitance electrodes 03 through direct coupling, when a human body touches the screen, only self-capacitance electrodes 03 under the touch positions will experience large capacitance value variations, while self-capacitance electrodes 03 adjacent the self-capacitance electrodes 03 under the touch positions will experience very small capacitance value variations. Thus, for example, when a finger slides on the touch panel, there may be situations in which it is impossible to determine touch coordinates of regions of self-capacitance electrodes 03. Therefore, in the above-mentioned in-cell touch panel provided in one embodiment of the present invention, it is possible to configure opposite sides of adjacent two self-capacitance electrodes 03 as bend lines (zigzag lines) so as to increase capacitance value variation of self-capacitance electrodes 03 adjacent to the self-capacitance electrode 03 under the touch position.

In different implementations, it is possible to set the overall shape of self-capacitance electrodes 03 in one of or combination of the following ways.

Figure 5A:
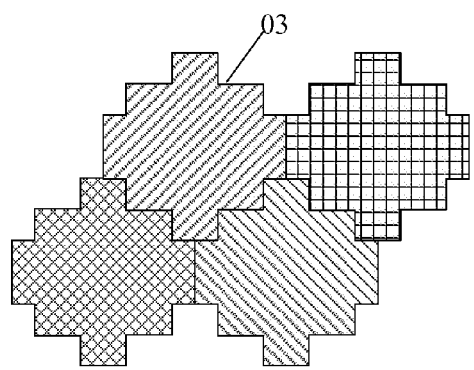
FIGS. 5a and 5b are structural views showing adjacent self-capacitance electrodes having opposite sides configured as bend lines in the in-cell touch panel provided in an embodiment of the present invention respectively.

It is possible to configure opposite sides of two adjacent self-capacitance electrodes 03 that are bend lines as step-like structures such that two step-like structures have consistent and matching structural shapes as shown in FIG. 5a that shows 2 * 2 self-capacitance electrodes 03.

Figure 5B:
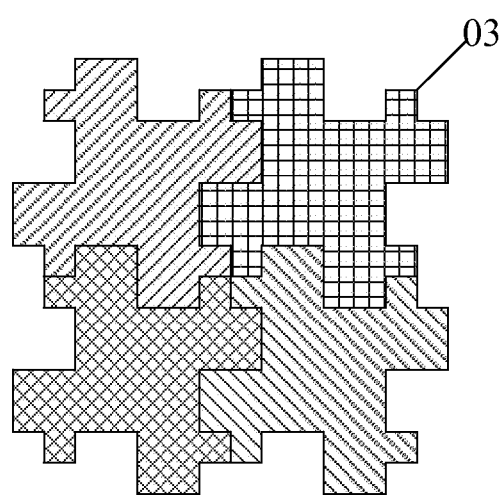

It is possible to configure opposite sides of two adjacent self-capacitance electrodes 03 that are bend lines as concave-convex structures such that two concave-convex structures have consistent and matching structural shapes as shown in FIG. 5b that shows 2 * 2 self-capacitance electrodes 03.

For example, in the above-mentioned in-cell touch panel provided in embodiments of the present invention, it is possible to manufacture wires 05 connected with self-capacitance electrodes 03 with metal or transparent conducting material. For example, the transparent conducting material may be indium tin oxide (ITO), indium zinc oxide (IZO), carbon nanotube or graphene. In one embodiment, wires 05 may be made of metal. This is because metals have smaller resistance than ITO, which is favorable to reduce resistance of wires 05 and thereby reduce loss in signal transmission by wires 05.

In one embodiment, while manufacturing wires 05 with a metal, in order to not influence normal display, it is possible to make orthogonal projections of patterns of wires 05 on the bottom substrate 02 to be within regions of the pattern of black matrix layer 07.

For example, in the above-mentioned touch panel provided in the embodiment of the present invention, since self-capacitance electrodes 03 and wires 05 are disposed on different layers, an insulating layer is generally provided between them such that a wire 05 and a self-capacitance electrode 03 that are required to be connected with each other can be electrically connected through via holes in the insulating layer. Self-capacitance electrodes 03 and wires 05 are both disposed on the top substrate 01. Thus, it is possible to use a layer originally comprised in the top substrate 01 as the insulating layer, that is, it is enough to add a patterning process for the common electrode layer 06 and a manufacturing process of wires 05 in the manufacturing process of the top substrate 01. In one embodiment, as shown in FIG. 2, the black matrix layer 07 is generally located on a side of the top substrate 01 that faces the bottom substrate 02, and a color filter layer 08 is generally provided on the black matrix layer 07. The common electrode layer 06 in which self-capacitance electrodes 03 are formed may be provided on the color filter layer 08. Therefore, it is possible to dispose wires 05 between the black matrix layer 07 and color filter layer 08. In this way, self-capacitance electrodes 03 and corresponding wires 05 may be electrically connected through via holes in the color filter layer 08.

While designing a touch panel in accordance with self-capacitance principle, as shown in FIG. 3, each self-capacitance electrode 03 is generally connected with the touch sensing chip 04 through one separate lead-out wire. Each lead-out wire may include: a wire 05 for connecting the self-capacitance electrode 03 to the margin frame of the touch panel, and a periphery wiring 10 disposed at margin frame for connecting the self-capacitance electrode 03 to a connection terminal 09 of the touch sensing chip, that is, the periphery wiring 10 is electrically connected with the connection terminal 09 of the touch sensing chip 04. The periphery wirings 10 and the connection terminals 09 of touch sensing chip 04 are generally disposed at the margin frame on a side of the bottom substrate 02 that faces the top substrate 01. Therefore, in one embodiment, self-capacitance electrodes 03 may be connected firstly to the margin frame of the in-cell touch panel by wires 05 and then electrically connected with corresponding periphery wirings 10 through sealant.

Based on the same inventive concept, at least one embodiment of the present invention further provides a display device including the above-mentioned in-cell touch panel provided in any embodiment of the present invention. The display device may be any product or component having display function such as a cellphone, a tablet computer, a TV set, a display, a notebook computer, a digital picture frame, a navigator or the like. The above-mentioned embodiments of the in-cell touch panel may be referred to for implementations of the display device and repetitions will not be described any more.

For the in-cell touch panel and display device provided in embodiments of the present invention, the common electrode layer is reused as self-capacitance electrodes with self-capacitance principle by modifying the pattern of common electrode layer of a TN mode array substrate to partition it into a plurality of independent self-capacitance electrodes and adding a layer of wires for connecting self-capacitance electrodes to the touch sensing chip on the top substrate. As compared to the display panel shown in FIG. 1, for the touch panel provided in embodiments of the present invention, it is possible to eliminate touch dead zones in the touch panel by only adding one layer of wires disposed on different layer from self-capacitance electrodes after reusing the common electrode layer as self-capacitance electrodes, thereby implementing touch function without a touch dead zone and improving signal-to-noise ratio of the touch performance.

It is understood that one skilled in the art can make various modifications and variations to the present invention without departing from the spirit and scope of the present invention. Thus, if these modifications and variations of the present invention fall within the scope of claims and their equivalents of the present invention, it is intended that the present invention contains these modifications and variations.

The present application claims priority of China Patent application No. 201410240495.5 filed on May 30, 2014, the content of which is incorporated in its entirety as part of the present application by reference herein.

The invention claimed is:

1. An in-cell touch panel comprising a top substrate and a bottom substrate disposed opposite to each other, a plurality of self-capacitance electrodes disposed on a same layer and independent from each other, a black matrix layer, a color filter layer, a touch sensing chip and a plurality of wires for connecting the self-capacitance electrodes to the touch sensing chip, wherein the self-capacitance electrodes and the wires are both disposed on a side of the top substrate that faces the bottom substrate;

an orthographic projection of at least one wire in a plane where the bottom substrate is located at least partially overlapped with an orthographic projection of the self-capacitance electrodes, which are not electrically connected with the at least one wire, in a plane where the bottom substrate is located;

the self-capacitance electrodes constitute a common electrode layer and the wires and the self-capacitance electrodes are disposed on different layers; and the touch sensing chip is configured to apply common electrode signals to self-capacitance electrodes in a display time period and determine touch positions by detecting capacitance value variation of self-capacitance electrodes in a touch time period;

the color filter layer comprises color filters with different colors, the black matrix layer is disposed between color filters with different colors of the color filter layer;

orthogonal projections of gaps between two adjacent ones of the self-capacitance electrodes on the bottom substrate are completely within orthogonal projection of the black matrix layer on the bottom substrate;

each of the self-capacitance electrodes corresponds to a plurality of color filters with different colors of the color filter layer.

2. A display device comprising the in-cell touch panel of claim 1.

3. The in-cell touch panel of claim 1, further comprising: periphery wirings electrically connected with connection terminals of the touch sensing chip, wherein, the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings through sealant.

4. The in-cell touch panel of claim 1, wherein the black matrix layer disposed on a side of the top substrate facing the bottom substrate or on a side of the bottom substrate facing the top substrate.

5. The in-cell touch panel of claim 4, further comprising: periphery wirings electrically connected with connection terminals of the touch sensing chip, wherein, the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings through sealant.

6. The in-cell touch panel of claim 4, wherein the black matrix layer is located on a side of the top substrate facing the bottom substrate and the color filter layer is disposed on the black matrix layer;

the common electrode layer is located on the color filter layer, the wires are located between the black matrix layer and the color filter layer, and the self-capacitance electrodes and corresponding wires are electrically connected through via holes in the color filter layer.

7. The in-cell touch panel of claim 6, further comprising: periphery wirings electrically connected with connection terminals of the touch sensing chip, wherein, the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings through sealant.

8. The in-cell touch panel of claim 4, wherein orthogonal projections of the wires on the bottom substrate are within regions of the pattern of the black matrix layer.

9. The in-cell touch panel of claim 8, further comprising: periphery wirings electrically connected with connection terminals of the touch sensing chip, wherein, the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings through sealant.

10. The in-cell touch panel of claim 4, wherein opposite sides of adjacent two of the self-capacitance electrodes are both bend lines.

11. The in-cell touch panel of claim 10, wherein orthogonal projections of the wires on the bottom substrate are within regions of the pattern of the black matrix layer.

12. The in-cell touch panel of claim 10, wherein the opposite sides of adjacent two self-capacitance electrodes that are bend lines both have step-like structures that are consistent and match each other.

13. The in-cell touch panel of claim 10, wherein the opposite sides of adjacent two self-capacitance electrodes that are bend lines both have concave-convex structures that are consistent and match each other.

14. The in-cell touch panel of claim 10, further comprising: periphery wirings electrically connected with connection terminals of the touch sensing chip, wherein, the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings through sealant.

15. The in-cell touch panel of claim 10, wherein the black matrix layer is located on a side of the top substrate facing the bottom substrate and a color filter layer is disposed on the black matrix layer;

the common electrode layer is located on the color filter layer, the wires are located between the black matrix layer and the color filter layer, and the self-capacitance electrodes and corresponding wires are electrically connected through via holes in the color filter layer.

* * * * *